(12) United States Patent
Farahmandi

(10) Patent No.: US 8,599,534 B2
(45) Date of Patent: Dec. 3, 2013

(54) ACTIVE ELECTROLYTE ELECTROCHEMICAL CAPACITOR

(76) Inventor: Cambis Joseph Farahmandi, Chula Vista, CA (US)

( * ) Notice: Subject to any disclaimer, the term of this patent is extended or adjusted under 35 U.S.C. 154(b) by 122 days.

(21) Appl. No.: 13/139,222

(22) PCT Filed: Dec. 11, 2009

(86) PCT No.: PCT/US2009/067776
§ 371 (c)(1),
(2), (4) Date: Jun. 10, 2011

(87) PCT Pub. No.: WO2010/068929
PCT Pub. Date: Jun. 17, 2010

(65) Prior Publication Data
US 2011/0249373 A1 Oct. 13, 2011

Related U.S. Application Data

(60) Provisional application No. 61/122,330, filed on Dec. 12, 2008.

(51) Int. Cl.
*H01G 9/00* (2006.01)
(52) U.S. Cl.
USPC ........... 361/502; 361/503; 361/504; 361/512; 361/517; 361/519

(58) Field of Classification Search
USPC .................................. 361/502, 519
See application file for complete search history.

(56) References Cited

U.S. PATENT DOCUMENTS

| 5,472,807 | A | * | 12/1995 | Licht et al. | 429/188 |
| 8,094,433 | B2 | * | 1/2012 | Tian et al. | 361/502 |
| 2005/0074653 | A1 | | 4/2005 | Broman et al. | |
| 2005/0244707 | A1 | | 11/2005 | Skyllas-Kazacos et al. | |
| 2012/0268074 | A1 | * | 10/2012 | Cooley et al. | 320/130 |

FOREIGN PATENT DOCUMENTS

JP 05-242905 A 9/1993

OTHER PUBLICATIONS

Linder, Nora, Preliminary Report on Patentability for PCT/US2009/067776, International Bureau of WIPO, Date of issuance: Jun. 14, 2011.
Park, Roh, Choon, International Search Report, PCT/US2009/067776, Korean Intellectual Property Office, Jul. 26, 2010.

* cited by examiner

*Primary Examiner* — Nguyen T Ha
(74) *Attorney, Agent, or Firm* — Joseph R. Baker, Jr.; Gavrilovich, Dodd & Lindsey LLP

(57) ABSTRACT

The disclosure relates to electrochemical capacitors. In particular the disclosure relates to asymmetric electrochemical capacitors and methods to improve service life and energy density.

5 Claims, 5 Drawing Sheets

ACTIVE ELECTROLYTE ELECTROCHEMICAL CAPACITOR

CROSS-REFERENCE TO RELATED APPLICATIONS

This application is a U.S. National Stage Application filed under 35 U.S.C. §371 and claims priority to International Application No. PCT/US09/67776, filed Dec. 11, 2009, which application claims benefit of U.S. provisional patent application Ser. No. 61/122,330, filed Dec. 12, 2008, the disclosures of which are incorporated herein by reference.

FIELD OF INVENTION

The invention relates to electrochemical capacitors. In particular the invention relates to asymmetric electrochemical capacitors and methods to improve service life.

BACKGROUND

Electrochemical capacitors are energy storage devices that are also referred to as electric double layer capacitors, supercapacitors and ultracapacitors. Electrochemical capacitors are desirable for a host of short power burst applications. Traditionally, these devices store energy by charging the electrode/electrolyte interface layer also known as the electric double layer. Double layer charging is based on the electrosorption of ions onto high surface area electrodes at the electrode/electrolyte interface, under the presence of an externally applied electric field. Symmetric electrochemical capacitors utilize the same energy storage mechanism for both electrodes and traditionally make use of electric double layer charging for the bulk of their energy storage capability. Symmetric electrochemical capacitor devices exhibit many highly desirable performance characteristics including: high energy density in comparison to electrolytic capacitors, high power in comparison to rechargeable battery systems, high cycle life, wide temperature operation, safety tolerant high-rate charge and discharge capability, safety tolerant overvoltage characteristics, and easily monitored state-of-of charge. Symmetric electrochemical capacitors have been known in the art for some time, as evidenced by Becker U.S. Pat. No. 2,800,616, and Boos et al. U.S. Pat. No. 3,648,126. Although symmetric electrochemical capacitors have high energy in comparison to electrolytic capacitors their energy storage capability is low in comparison to other devices such as rechargeable batteries. In order to increase energy storage capability, species are often introduced to one or both of the electrode structures that undergo faradic reactions. Faradaic reactions are heterogeneous charge transferred reactions where in electrical charge is transferred across a phase boundary. This type of energy storage mechanism is analogous to the energy storage mechanism used in rechargeable batteries. Faradaic reactions are more energetic than the process of storing charge in the electric double layer, hence using electrodes that contain species that undergo faradaic transformations can increase the energy storage capability of electrochemical capacitors that rely solely on double layer charging. Devices that utilize faradaic reactions for part or all of their energy storage are broadly known in the art as "pseudo-capacitors". Often an asymmetric design approach is taken, where a faradaic process is utilized primarily on one electrode and electric double layer charging is utilized primarily on the other electrode.

SUMMARY

The invention provides devices comprising high energy coupled with long service life in electrochemical capacitors. An active electrolyte electrochemical capacitor is an asymmetric electrochemical capacitor that utilizes soluble reaction couples for the energy storage mechanism on one electrode of an electrochemical cell. The opposing electrode of the cell utilizes primarily double layer charging. The use of soluble reaction couples are desirable because there are little or no morphological or phase changes on the electrode surface during charge and discharge because the active materials remain dissolved in solution. Because of the reduced transformations of the electrode material, the cell may exhibit excellent service life. In order to prevent the dissolved activated materials from transporting to an opposing electrode and reacting back to their original state, a selective separator material is employed. The selective material impedes transport of the activated species while allowing conduction of ionic current in the cell. Such ion selective membranes are utilized in place of traditional separator materials. The edges of the ion selective membrane may be sealed such that activated ions are prevented from transporting around the separator material to the opposing electrode.

The disclosure provides an energy storage device comprising a first half-cell containing a redox couple that remains dissolved in a solution, a second half-cell that stores electric charge substantially in the electric double layer, and a membrane between said first half-cell and said second half-cell that is selective to cation or anion transport. In one embodiment, the solution is stationary and not flowing. In another embodiment, the solution contains water, propylene carbonate, acetonitrile, ammonia, γ-butyrolactone, dimethyl formamide, dimethyl sulfoxide, acetone, or an ionic liquid. In one embodiment the redox couple includes electroactive species of chromium, sulfur, iron, bromine, tin, antimony, titanium, copper, cerium, vanadium, or manganese. In yet another embodiment, the second half cell contains at least one electrode with an interfacial surface area between the electrode and solution of greater than 50 square meters per gram.

The disclosure also provides an energy storage device comprising: (a) redox couple that remains dissolved in a solution, (b) at least one first electrode that supplies electrical charge for said redox couple, (c) at least one second electrode that stores electric charge substantially in the electric double layer, and (d) a membrane between said first electrode and said second electrode that is selective to cation or anion transport. In one embodiment, the solution is stationary and not flowing. In another embodiment, the solution contains water, propylene carbonate, acetonitrile, ammonia, γ-butyrolactone, dimethyl formamide, dimethyl sulfoxide, acetone, or an ionic liquid. In one embodiment the redox couple includes electroactive species of chromium, sulfur, iron, bromine, tin, antimony, titanium, copper, cerium, vanadium, or manganese. In yet another embodiment, the second half cell contains at least one electrode with an interfacial surface area between the electrode and solution of greater than 50 square meters per gram.

DETAILED DESCRIPTION

Figure 1:
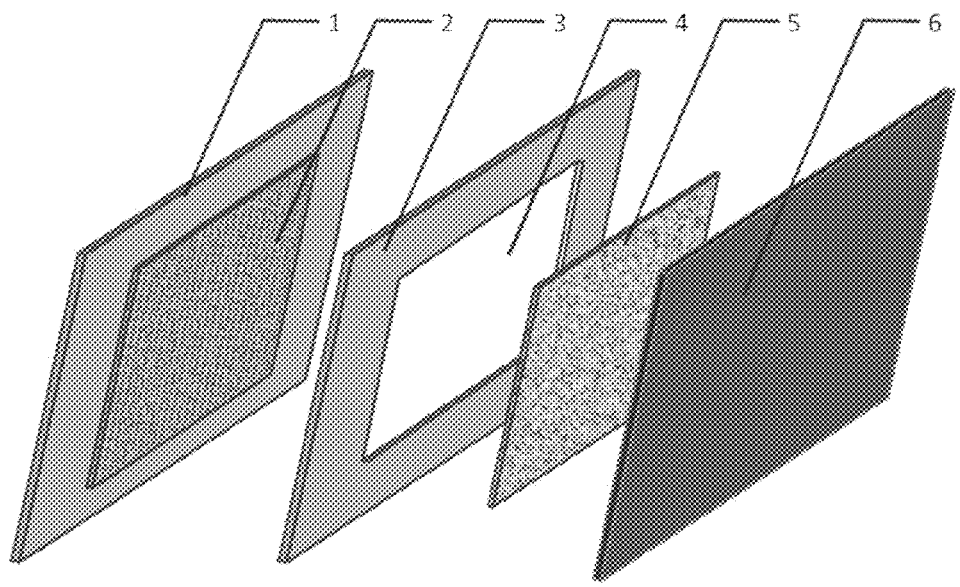
FIG. 1 Diagram of an exploded view of an active electrolyte electrochemical capacitor.

As used herein and in the appended claims, the singular forms "a," "and," and "the" include plural referents unless the context clearly dictates otherwise. Thus, for example, reference to "an electrolyte" includes a plurality of such electrolytes and reference to "the substrate" includes reference to one or more substrates and equivalents thereof, and so forth.

Unless defined otherwise, all technical and scientific terms used herein have the same meaning as commonly understood to one of ordinary skill in the art to which this disclosure belongs. Although any methods and reagents similar or equivalent to those described herein can be used in the practice of the disclosed methods and compositions, the exemplary methods and materials are now described.

Also, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

All publications mentioned herein are incorporated herein by reference in full for the purpose of describing and disclosing the methodologies, which are described in the publications, which might be used in connection with the description herein. The publications discussed above and throughout the text are provided solely for their disclosure prior to the filing date of the present application. Nothing herein is to be construed as an admission that the inventors are not entitled to antedate such disclosure by virtue of prior disclosure.

Use of faradic reactions in the electrodes of electrochemical capacitors can increase the energy density in comparison to an electrode relying solely on double layer charging. One drawback of using faradic charge transfer reactions on the electrode structure is that they are typically not as reversible as the double layer charging process. Phase and morphological transformations are seen in the electrode that limits cycle life. Because double layer charging is a highly reversible electrostatic process with no phase transformations the electrode cycle life is typically greater than electrodes utilizing faradaic processes. The disclosure provides methods and compositions that increase energy density in electrochemical capacitors while maintaining long service life and other desirable performance characteristics.

Soluble reaction couples are a class of materials that can be reversibly electrochemically oxidized or reduced and remain soluble in solution in both the oxidize and reduce state. For these species the electrode material supplies or accepts electrical charge for the electrochemical reactions but otherwise remains primarily chemically inert. The inert electrodes exhibit little or no morphological changes during cycling, and hence can exhibit long cycle life performance. Soluble reaction couples are utilized in redox flow batteries, in part because of their high cyclability, and in part because the activated materials can be stored in bulk away from the electrode structures.

Figure 2:
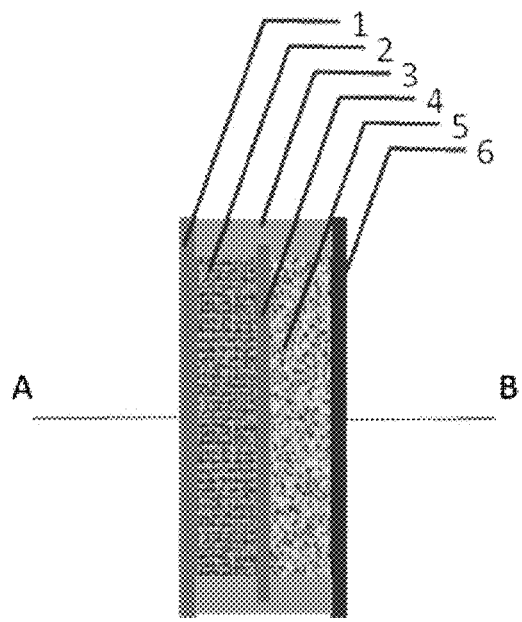
FIG. 2 Cross sectional view of an active electrolyte electrochemical capacitor.

FIG. 1 diagrams an exploded view of an active electrolyte capacitor. The cell consists of a redox electrode (2) that is design to efficiently electrochemically oxidize and reduce the soluble redox couple. A current collecting backing plate (1) may be employed and electrically connected to the redox electrode (2). The current collecting plate is constructed from an inert highly conductive material and is designed to allow efficient current flow into and out of the redox electrode (2). A selective membrane (4) is positioned between the redox electrode and the double layer electrode and is designed to prevent or slow the transport of the activated species of the soluble redox couple from reaching the double layer electrode (5). A gasket or seal material (3) may be employed to prevent the activated species from transporting around the ion selective membrane and reaching the double layer capacitor electrode (5). A current collecting plate (6) may be employed and electrically connected to the double layer electrode. The current collecting plate is constructed from an inert highly conductive material and is designed to allow efficient current flow into and out of the double layer electrode (5). FIG. 2 diagrams the cross sectional view of the active electrolyte capacitor. The electrical terminals of the capacitor A and B may be positive or negative depending of the nature of the soluble redox couple.

It is understood that the active electrolyte cell can be connected in series or parallel configurations using methods that are known in the art. Such methods include a spiral wound configuration using single or double sided electrodes, bipolar configurations, or electrically connecting multiple cells in parallel as is often done for packaging in a prismatic configuration. Other packaging configurations that are known in the art may also be employed.

There are a variety of materials that can be utilized as the soluble redox couple in the invention. It is desirable, although not required, that the active redox couple be highly soluble in the electrolytic solution and form solutions with high ionic conductivity. It is desirable, although not required, that the oxidation/reduction reaction of the couple is highly reversible and cyclable at high reaction rates on an acceptable electrode surface. In addition, the active electrolyte solution should possess wide temperature performance, be safe, environmentally friendly, and low cost. Additionally it is desirable that the material be electrochemically stable over a large voltage window to allow efficient double layer charging on the opposite electrode. Several ionic reaction couples have been investigated in aqueous solutions for use in flow battery systems and are known to possess desirable reaction characteristics. These materials include those set forth in Table 1.

TABLE 1

Soluble Reaction Couples

| Base Element | Reaction | Standard Potential (V) |
|---|---|---|
| Negative Electrode | | |
| Chromium | $Cr^{3+} + e^- \rightarrow Cr^{2+}$ | −0.42 |
| Sulfur | $S_4^{2-} + 2e^- \rightarrow 2S_2^{2-}$ | −0.265 |
| Positive Electrode | | |
| Iron | $Fe^{3+} + e^- \rightarrow Fe^{2+}$ | 0.77 |
| Bromine | $Br_3^- + 2e^- \rightarrow 3Br^-$ | 1.09 |

These reaction couples represent the typical redox couples for the invention; however, in principle, any reversible oxidation/reduction reaction whose species remain soluble in solution in both the oxidized and reduced states can be utilized as the active material in the invention. Other reaction couples that are known to possess desirable characteristics include:

Tin, $Sn^{2+}/Sn^{4+}$,
Antimony, $Sb^{3+}/Sb^{6+}$,
Titanium, $Ti^{3+}/Ti^{4+}$,
Copper, $Cu^{+1}/Cu^{+2}$,
Cerium $Ce^{+3}/Ce^{+4}$,
Vanadium, $V^{+2}/V^{+3}$, $V^{+3}/V^{+4}$, $V^{+4}/V^{+5}$,
Chromium hexacyanide, $Cr(CN)_6^{4-}/Cr(CN)_6^{-3}$,
$Cu(NH_3)_2^{1+}/CU(NH_3)_4^2$, and
Manganese, $Mn^{+2}/Mn^{+3}$, $Mn^{+4}/Mn^{+7}$ In addition materials known in the art as redox shuttle reactions that provide overvoltage protection in electrochemical energy storage applications are known to possess desirable properties and can be utilized as the soluble redox couple in the invention. Examples of such materials include thianthrene or a derivative of thianthrene, or organometallic compounds, known as metallocenes, such as bis(cyclopentadienyl)iron, known as ferrocene; bis(n-butyl-cyclopentadienyl)iron, known as butylferrocene; bis(cyclopentadienyl) nickel, known as nickelocene; and bis(cyclopentadienyl) cobalt, known as cobaltocene.

Other soluble reaction couples may also show acceptable performance. In addition one or more reaction couples can be utilized.

For the purposes of describing the invention the cation and anion reactions can be represented as:

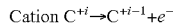
Cation $C^{+i} \rightarrow C^{+i-1} + e^-$

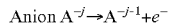
Anion $A^{-j} \rightarrow A^{-j-1} + e^-$

As can be seen in Table 1 for the reactions based on polysulfide and bromide ions the mechanism may be more complex and not follow the simplified form. The cation and anion reactions described may also include materials with a zero valence state in either the oxidized or reduced form. A key characteristic of the active material is that it remains soluble in solution for both the oxidized and reduced states. The simplified reactions will be used in the following descriptions for ease and clarity.

Figure 3:
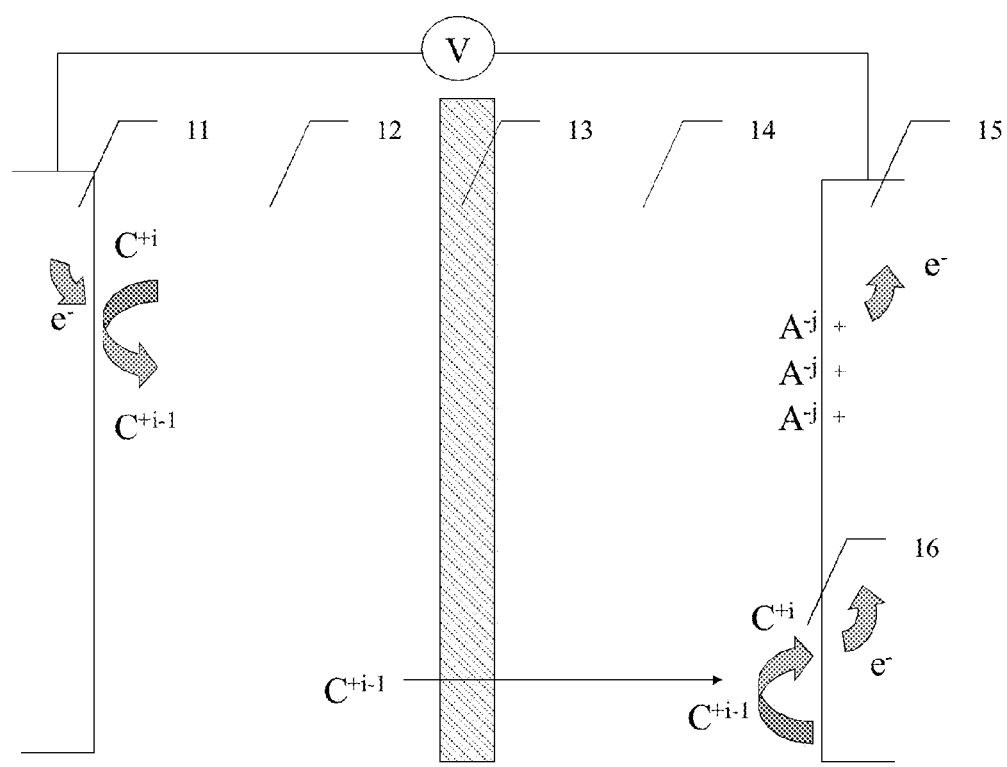
FIG. 3 Diagram of the charging processes of an active electrolyte electrochemical capacitor using reduction of the cation in the negative electrode region and double layer charging in the positive electrode region.
Figure 4:
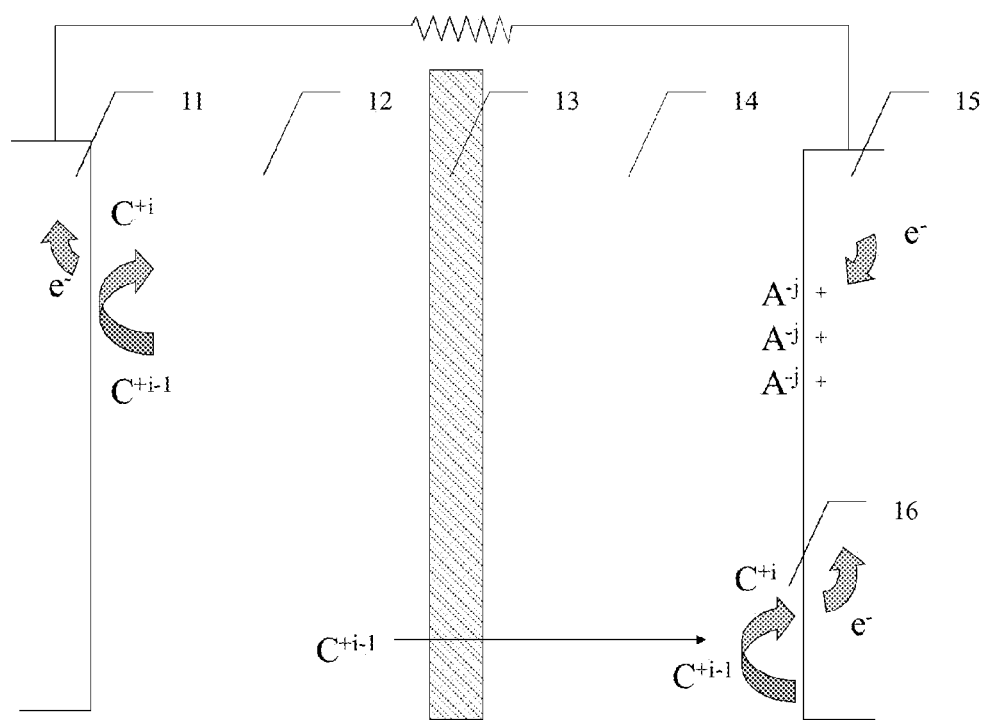
FIG. 4 Diagram of the discharge processes of an active electrolyte electrochemical capacitor using oxidation of the cation in the negative electrode region and double layer charging in the positive electrode region.

The charge and discharge processes of the first embodiment of the invention are shown in FIG. 3 and FIG. 4, respectively. The cell stores charge through reduction of the active species at the negative electrode (11) and double layer charging on the positive electrode (15). For this embodiment the active ion is the cation, C. The cation has a positive charge of +i. During charging the cation is electrochemically reduced resulting in a reduction in the charge state equal to the number of electrons transferred, in this case 1. The resulting reduced cation remains in solution and is transported away from the electrode but is retained in the negative electrode region (12). An ion selective membrane (13) is used to retard the reduced ion from transporting to the positive electrode region (14) where it would be oxidized back to its original state resulting in a self-discharge reaction on the electrode surface (16). The ion selective membrane must allow transport of at least one non-active ion to maintain charge neutrality. The transported ion may be the non-active anion or a supporting ion that is present in the electrolytic solution. The direction of ion transport through the membrane will be such that charge neutrality is achieved. Standard double layer electrodes known in the art can be utilized for the positive electrode. As shown in FIG. 4 during discharge the processes are reversed and the cell is returned to its initial state. The $Cr^{+2}/Cr^{+3}$ reaction couple listed in Table 1 is an example of an active material that can be utilized in this manner; however, other species that undergo reversible reduction at negative potentials can also be considered.

An alternative embodiment is to use the anion $A^{-j}$ as the active species in place or in conjunction with the active cation, $C^{+i}$ described above. During charging the anion is electrochemically reduced resulting in a reduction in the charge state equal to the number of electrons transferred. The ion selective membrane is modified to retard transport of the active anion through the membrane but allows ionic current to flow and maintain charge neutrality. The functionality of the positive double layer electrode and other cell components remain unchanged. The polysulfide reaction ($S_4^{2-}/S_2^{2-}$) listed in Table 1 is an example of a reaction couple for this embodiment; however, other anions that can be reversibly oxidized and reduced can also be utilized.

Figure 5:
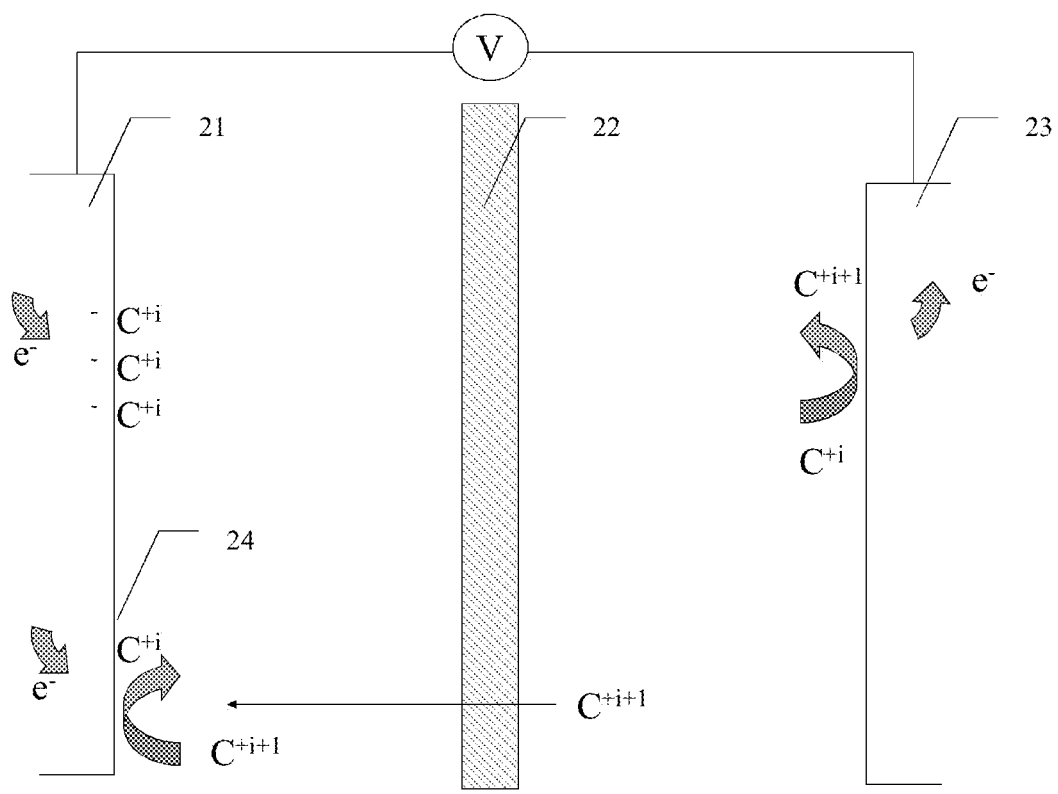
FIG. 5 Diagram of the charge processes of an active electrolyte electrochemical capacitor using oxidation of the cation in the positive electrode region and double layer charging in the negative electrode region.

As shown in FIG. 5, the function of the positive and negative electrodes can be switched utilizing the negative electrode (21) for double layer charging and the positive electrode (23) to store charge through an active electrolytic solution reaction. In this embodiment, the active cation is electrochemically oxidized to $C^{+i+1}$. An ion selective membrane (22) is used to prevent the oxidized ion from transporting to the negative electrode where it would be reduced back to its original state resulting in a self-discharge reaction (24). The ion selective membrane allows transport of at least one non-active ionic species to maintain charge balance in the cell. During discharge the processes are reversed and the cell is return back to its original state. The ferric couple $Fe^{3+}/Fe^{2+}$ is an example of a material for this embodiment, however, other materials that undergo reversible oxidation at positive potentials can be utilized in this manner.

An alternative embodiment is to use the anion, A, as the active species in place or in conjunction with the active cation, $C^{i+}$, as described above. The active material is oxidized on the positive electrode. The ion selective membrane is modified to retard transport of the active anion through the membrane but allows ionic current to flow and maintain charge neutrality. The functionality of the positive double layer electrode and other cell components remain unchanged from the descriptions above. The $Br_3^{-1}/Br^{-1}$ reaction couple listed in Table 1 is an example of an active material that can be utilized in this manner; however, other species that undergo reversible oxidation at positive potentials can also be considered.

The active materials described in the above embodiments may be dissolved in supporting electrolytic solutions. Such solutions can use water as the base solvent in acid, base, or salt solutions, or non-aqueous solvents can be used provided they are able to dissolve the reaction couple. Examples of non-aqueous solvents that can be used include carbonates, esters, ethers, lactones, nitrites, amides, ionic liquids and sulfones. In addition, the solvent can either be used alone or in the form of a mixture of two or more types of solvent. Specific examples of the solvent include propylene carbonate, ethylene carbonate, diethyl carbonate, dimethyl carbonate, methylethyl carbonate, dimethoxyethane, acetonitrile, propionitrile, tetrahydrofuran, 2-methyltetrahydrofuran, dioxane, nitromethane, N,N-dimethylformamide, dimethylsulfoxide, sulfolane, ammonia, and .gamma.-butyrolactone. Additionally, supporting electrolytes may be added to the solvent in order to increase conductivity of the solution. For the reaction couples listed in Table 1, Useful electrolytic solutions are listed in the Table 2 but alternative solutions may yield acceptable results.

TABLE 2

Examples of Electrolytic Solutions

| Reaction | Electrolytic Solution |
|---|---|
| $Cr^{3+} + e^- \rightarrow Cr^{2+}$ | 1-2 M $CrCl_3$ in 5N HCl |
| $S_4^{2-} + 2e^- \rightarrow 2S_2^{2-}$ | 1-2 M $Na_2S$ in $H_2O$ |
| $Fe^{3+} + e^- \rightarrow Fe^{2+}$ | 1-2 M $FeCl_3$ in 4N HCl |
| $Br_3^- + 2e^- \rightarrow 3Br^-$ | 1-5 M NaBr in $H_2O$ |

The ion selective membrane is constructed from a material substantially impermeable to the active ion but permeable to at least one other ion, allowing electrical operation of the cell. Dupont's Nafion membrane is conductive to cations including $H^+$ and $Na^+$, and is the typical material in cells with active anions, for example the polysulfide and bromide reactions shown in Table 1. The active cation reactions $Cr^{+3}$ and $Fe^{+3}$ shown in Table 1 in their configurations utilize acidic electrolytic solutions with free $H^+$. Redox flow batteries have demonstrated the feasibility of using both anion and cation selective membranes to retard multivalent active cation transport (C. Ponce de Leon et al., Journal of Power Sources, Volume 160, Issue 1, 29, Pages 716-732, September 2006). Operation with cation selective membranes, such as Dupont Nafion, is achieved because the material has been shown to retard transport of multivalent cations as well as anions. The $H^+$ in solution provides the medium for ionic current flow through the membrane. For this reason Nafion provides acceptable performance in cells employing the $Cr^{+3}$ and $Fe^{+3}$ reactions. Presently, Dupont Nafion is the a typical material for cells utilizing the $Cr^{+3}$ and $Fe^{+3}$ reactions, however, other membranes including anion selective membranes may also provide acceptable performance.

It is desirable, but not required, that the electrode material employed for the active electrolyte reaction is low in cost, design such that it provides acceptable reaction rates, high reversibility, and processes long life. Electrode technologies known in the art can be utilized for the electrode. Electrodes fabricated with graphitic or high surface area carbon are attractive because of their low cost and high endurance. Similarly, double layer capacitor electrodes known in the art can be utilized with this invention. High surface area activated carbon electrodes currently provide the highest performance in terms of cost, endurance, and electrical performance. Typically these electrodes have interfacial surface areas between 50 and 3000 square meters per gram.

An active electrolyte electrochemical capacitor can have significantly higher energy density over symmetric designs that employ two double layer capacitor electrodes because of several factors. First, if an active electrolyte is utilized the energy density is determined by the concentration of the activated species in the electrolytic solution. Ultimately the energy density of double layer capacitor electrodes is also limited by the concentration of electrolyte species as calculated by Zheng (Jim P. Zheng, Journal of The Electrochemical Society, 150, p. A484-A492 (2003)); however, the current energy storage capability of double layer capacitor electrodes is lower than the capacity suggested by ion concentration. In addition because double layer capacitors store charge through the adsorption on the electrode surface a higher electrode mass and volume is typically needed, which lowers the effective energy density. Furthermore, the energy is increased in many reaction couples because charge transfer occurs at a greater potential than the double layer charging process. In faradic reactions charge is transferred at a potential related to the open circuit potential of the redox couple, whereas in a double layer electrode the potential increases linearly as the capacitor is charged. Additionally an active electrolyte electrochemical capacitor may possess higher power capability over other electrochemical capacitors due in part to a higher cell operating voltage. Higher power can also be achieved through cell design, such as utilizing thin electrode structures and other methods that are known in the art to achieve high power.

One embodiment of this invention utilizes a first electrode containing carbon manufactured from a polyacrylonitrile (PAN) based fiber, a second electrode utilizing an activated carbon with a BET surface area of over 1200 sq. meters per gram, an ion selective membrane made of Nafion (model NR-212 Dupont De Nemours & Co.), and a solution of 3M NaBr in water.

Another embodiment of this invention utilizes a first electrode containing carbon manufactured from a polyacrylonitrile (PAN) based fiber, a second electrode utilizing an activated carbon with a BET surface area of over 1200 sq. meters per gram, an ion selective membrane made of Nafion (model NR-212 Dupont De Nemours & Co.), and a solution of 1.5M M Na2S in water.

Another embodiment of this invention utilizes a first electrode containing carbon manufactured from a polyacrylonitrile (PAN) based fiber, a second electrode utilizing an activated carbon with a BET surface area of over 1200 sq. meters per gram, an ion selective membrane made of Nafion (model NR-212 Dupont De Nemours & Co.), and a solution of 1.5M $CrCl_3$ in 5N HCl.

Another embodiment of this invention utilizes a first electrode containing carbon manufactured from a polyacrylonitrile (PAN) based fiber, a second electrode utilizing an activated carbon with a BET surface area of over 1200 sq. meters per gram, an ion selective membrane made of Nafion (model NR-212 Dupont De Nemours & Co.), and a solution of 1.5M $FeCl_3$ in 4N HCl.

Another embodiment of this invention utilizes a first electrode containing carbon manufactured from a polyacrylonitrile (PAN) based fiber, a second electrode utilizing an activated carbon with a BET surface area of over 1200 sq. meters per gram, an anion selective membrane, and a solution containing dissolved bis(cyclopentadienyl)cobalt in a solution of 1.0 M tetraethylammonium tetrafluoroborate in acetonitrile.

An electrochemical capacitor with active electrolyte offers several performance advantages over prior art asymmetric electrochemical capacitors. Traditional electrodes that undergo faradaic reactions are designed for thousands of deep discharge cycles. In order to increase cycle life to the levels required for asymmetric electrochemical capacitor applications the capacity of the faradaic electrode is increase such that it only undergoes shallow discharge cycles. This approach limits the physical transformations that the electrode structure undergoes during the charge and discharge process, such as phase changes, dendrite formation, and electrode shape changes. The under utilization of the faradaic electrode results in reduced energy density and increased cost. In addition to added material cost, pre-charging or pre-doping processes may be required to fabricate the cell. These types of processes can be difficult to integrate into a high volume manufacturing process efficiently.

The following Examples are provided to further illustrate but not limit the invention described herein. Other embodiments will be readily apparent to one of skill in the art based upon the teachings herein.

EXAMPLE

Figure 6:
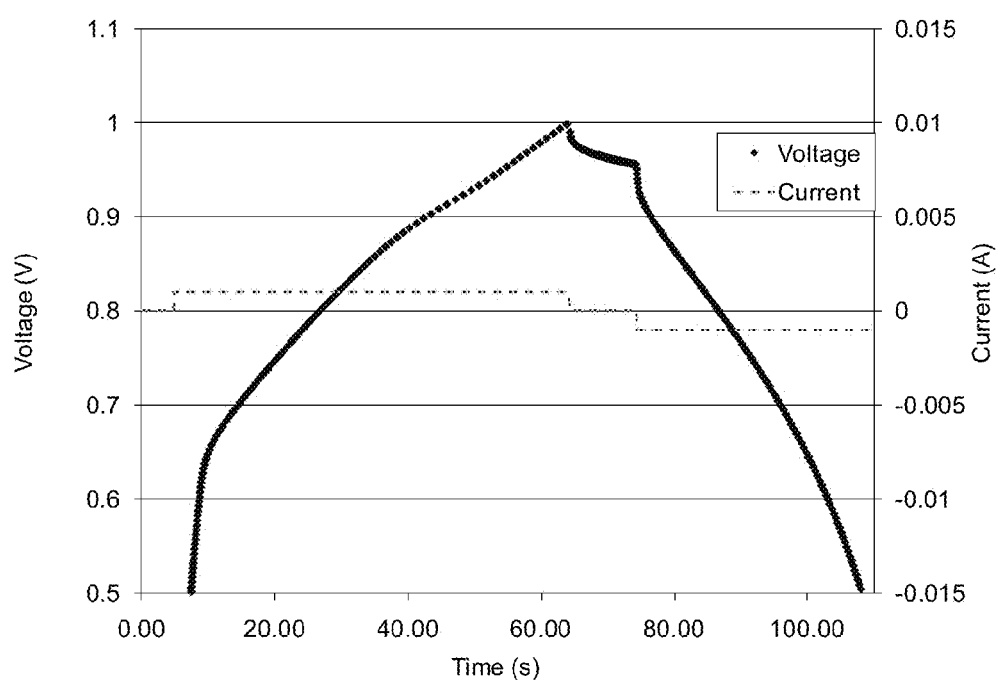
FIG. 6 Constant current charge and discharge of an active electrolyte capacitor.

Active electrolyte electrochemical capacitors were prepared using an active electrolytic solution of 1 M NaBr in water. The positive electrode material was constructed using a polyacrylonitrile (PAN) based carbon fabric that utilized a T-300 thread in a 2×2 plain weave, 13.25×13.25 picks per inch in both warp and fill directions. The cloth had a nominal thickness of 10 mils. The cloth was cut into square 1 inch pieces. Titanium foil, 1 mil thickness (Strem Chemical) was used as the current collector material. The carbon fabric was bonded to the current collector using EB-012 Electrodag (Acheson Colloids). The Electrodag material was applied to the current collector and the carbon cloth was laid on the coated collector surface. This composite structure was placed under pressure using c-clamps and heated for 30 min at 350° F. The double layer electrodes used for the negative electrode were fabricated using YP-17 activated carbon (Kuraray Chemical). The activated carbon was mixed with PFTE flouropolymer dispersion (T-30 E.I. du Pupont De Nemours & Co.) and a conductive carbon additive was added to lower electrode series resistance (Soltex Aceblack AB-50). The materials were added such that the weight ratio of activated carbon:PTFE:conductive carbon was 90:5:5. These materials were mixed and deionized water was added to the mixture to improve workability. The material was thoroughly mixed and then kneaded for several minutes to fibrillate the PTFE binder. The resulting mixture was extruded into a film with an approximate thickness of 5 mil using a rolling mill. 1 inch square pieces were cut from the film and used as the active material for the double layer electrode. Stainless steel foil was used as the current collector for the negative electrode. The electrodag material was applied to the current collector and the activated carbon film was laid on the coated collector surface. This composite structure was placed under pressure using c-clamps and heated for 30 min at 350° F. The ion selective membrane was constructed using Nafion NR-212 (Dupont De Nemours & Co.). The membrane was 5 mils thick and was cut into 1.5 inch square pieces. Prior to use the Nafion membrane was boiled in 1 M NaOH for 1 hour and rinsed in distilled water. Two inch square pieces of polyimide tape with a 1 inch square hole cut into the center (Kapton—Du Pont) were used as a seal/gasket material to prevent activated electrolyte leakage around the separator material. The cell was placed in a laminated film package (Showa Denko Al-laminated) and approximately 0.5 ml of 1 M NaBr was added to each half cell. The laminated film package was heat seal to create a final sealed cell pouch. FIG. 6 plots the voltage response to constant current cycling at 1 milliamp. From this data the discharge capacitance was calculated to be 0.1 farads. The series resistance was measured to be 3.3 ohm at 1 kHz using a frequency response analyzer (Solartron 1250).

What is claimed is:

1. An energy storage device comprising a first half-cell containing a redox couple that remains dissolved in a solution, a second half-cell that stores electric charge substantially through electrosorption of ions in an electric double layer, and a membrane between said first half-cell and said second half-cell that is selective to cation or anion transport.

2. The energy storage device of claim 1, wherein said solution is stationary and non-flowing.

3. The energy storage device of claim 1, wherein said solution is selected from the group consisting of water, propylene carbonate, acetonitrile, ammonia, γ-butyrolactone, dimethyl formamide, dimethyl sulfoxide, acetone, an ionic liquid, and any combinations thereof.

4. The energy storage device of claim 1, wherein said soluble redox couple is selected from the group consisting of electroactive species of chromium, sulfur, iron, bromine, tin, antimony, titanium, copper, cerium, vanadium, manganese, and any combinations thereof.

5. The energy storage device of claim 1, wherein said second half cell comprises at least one electrode with an interfacial surface area between the electrode and solution of greater than 50 square meters per gram.

* * * * *